United States Patent [19]

Nagano et al.

[11] 4,435,769
[45] Mar. 6, 1984

[54] PORTABLE TYPE AUTOMOBILE REPAIR ESTIMATE ISSUING DEVICE

[75] Inventors: Susumu Nagano, Tokyo; Seiichi Iruya, Saitama; Yoshinori Yasuda; Tomoaki Makino, both of Kanagawa, all of Japan

[73] Assignees: Mitsubishi Denki Kabushiki Kabushiki Kaisha; Japan Audatex Co., Ltd., both of Tokyo, Japan

[21] Appl. No.: 244,475

[22] Filed: Mar. 16, 1981

[30] Foreign Application Priority Data

Mar. 19, 1980 [JP] Japan .................................. 55-34939

[51] Int. Cl.³ .................... G06F 3/12; G06F 15/06; G11C 15/02
[52] U.S. Cl. .................................. 364/464; 364/406; 364/900
[58] Field of Search ... 364/200 MS File, 900 MS File, 364/403, 405, 400, 406, 464

[56] References Cited

U.S. PATENT DOCUMENTS

| | | | |
|---|---|---|---|
| 3,946,220 | 3/1976 | Brobeck et al. | 364/405 |
| 4,016,542 | 4/1977 | Azure | 364/900 |
| 4,118,788 | 10/1978 | Roberts | 364/900 |
| 4,133,034 | 1/1979 | Etter | 364/464 |

*Primary Examiner*—Felix D. Gruber
*Assistant Examiner*—Daniel K. Dorsey
*Attorney, Agent, or Firm*—Sughrue, Mion, Zinn, Macpeak and Seas

[57] ABSTRACT

An automobile repair estimate issuing device having a part data file made up of a first file for storing part data other than name data and a second file for storing the name data. The data file is stored in a memory having a reduced memory capacity. Input and output devices, a central processing device, the memory and a printing devices are reduced in size and weight thereby to provide a portable type automobile repair estimate issuing device which can issue a repair estimate at an automobile repairing place on the spot.

9 Claims, 15 Drawing Figures

| COLUMN | C6 | C1 | C3 | C4 | C5 |
|---|---|---|---|---|---|
| | 1 2 3 | 4 5 6 7 8 | 18  19 25 | 26 | 66 |

110

| | | | | |
|---|---|---|---|---|
| PIO | 195 | 67620-12411 | 9500 | ////////// |
| PIO | 195 | 67620-12460 | 9700 | ////////// |
| PIO | 195 | 67620-12470 | 10200 | ////////// |
| PIO | 195 | 67620-12241 | 6600 | ////////// |
| PIO | 195 | 67620-12231 | 6000 | ////////// |
| PIO | 195 | 67620-12281 | 5700 | ////////// |
| PIO | 195 | 67620 12271 | 5300 | ////////// |
| PIO | 196 | 68220-12010 | 1650 | ////////// |
| PIO | 196 | 68170-12080 | 1240 | ////////// |
| PIO | 196 | 68220-12020 | 1390 | ////////// |

| COLUMN | C1 | C2 |
|---|---|---|
| | 1 2 3 | 5    10    15    20    29 |

111

| | |
|---|---|
| 195 | LF♭DR♭TRM♭BRD♭SA |
| 196 | LF♭DR♭INRWTHR♭STP |
| 198 | LF♭DR♭OUTSID♭HNDL |

| COLUMN | $C_1$ | | $C_2$ | | $C_3$ | | $C_4$ | $C_5$ |
|---|---|---|---|---|---|---|---|---|
| | 56789 | | 15 20 25 | | 30 35 40 | | 45 50 | 90 |
| P10 | 195 | LFbDRbTRMbBRDbSA | | 67620-12411 | | 9500 | |
| P10 | 195 | LFbDRbTRMbBRDbSA | | 67620-12460 | | 9700 | |
| P10 | 195 | LFbDRbTRMbBRDbSA | | 67620-12470 | | 10200 | |
| P10 | 195 | LFbDRbTRMbBRDbSA | | 67620-12244 | | 6600 | |
| P10 | 195 | LFbDRbTRMbBRDbSA | | 67620-12231 | | 6000 | |
| P10 | 195 | LFbDRbTRMbBRDbSA | | 67620-12281 | | 5700 | |
| P10 | 195 | LFbDRbTRMbBRDbSA | | 67620-12271 | | 5300 | |
| P10 | 196 | LFbDRbINRWTHRbSTP | | 68220-12010 | | 1650 | |
| P10 | 196 | LFbDRbINRWTHRbSTPbA | | 68170-12080 | | 1240 | |
| P10 | 196 | LFbDRbINRWTHRbSTPbA | | 68220-12020 | | 1390 | |
| P10 | 196 | LFbDRbINRWTHRbSTPbA | | 68120-12090 | | 1120 | |

FIG. 8

| COLUMN | C6 | C7 | C3 | C4 | C5 |
|---|---|---|---|---|---|
| 1 2 3 4 5 6 7 8 | | | 18 19 25 | 26 | 66 |
| PIO 195 | 0 | 67620- | 12411 | 9500 | ///////// |
| PIO 195 | 0 | 67620- | 12460 | 9700 | ///////// |
| PIO 195 | 0 | 67620- | 12470 | 10200 | ///////// |
| PIO 195 | 0 | 67620- | 12241 | 6600 | ///////// |
| PIO 195 | 0 | 67620- | 12231 | 6000 | ///////// |
| PIO 195 | 0 | 67620- | 12281 | 5700 | ///////// |
| PIO 195 | 0 | 67620- | 12271 | 5300 | ///////// |
| PIO 196 | 0 | 68220- | 12010 | 1650 | ///////// |
| PIO 196 | 1 | 68170- | 12080 | 1240 | ///////// |
| PIO 196 | 1 | 68220- | 12020 | 1390 | ///////// |

~110

| COLUMN | C6 | C7 | C2 |
|---|---|---|---|
| 1 2 3 4 5 | | | 10   15   20   29 |
| 195 | 0 | | L F ♭ D R ♭ T R M ♭ B R D ♭ S A |
| 196 | 0 | | L F ♭ D R ♭ I N R W T H R ♭ S T P |
| 196 | 1 | | L F ♭ D R ♭ I N R W T H R ♭ S T P ♭ A |
| 198 | | | L F ♭ D R ♭ O U T S I D ♭ H N D L |

| NAME | LF DOOR INNER WEATHER STRIP | |
|------|-----------------------------|---|
| CODE | 196 | O  ⌒C70 |

C60⌒

| NAME | LF DOOR INNER WEATHER STRIP | A |
|------|-----------------------------|---|
| CODE | 196 | I |

FIG. 11

| NAME | | LIGHT | |
|------|---|-------|---|
| CODE | 365 | O ⌒C80 | |

C60

| NAME | | LAMP | |
|------|---|------|---|
| CODE | 365 | I ⌒C81 | |

PORTABLE TYPE AUTOMOBILE REPAIR ESTIMATE ISSUING DEVICE

BACKGROUND OF THE INVENTION

Automobiles have various parts which may have the same part name, although a part of one name may have different dimensions or a different configuration depending on the model year of the automobile in which it is used and the model type of the automobile, including modifications. Therefore, even if the automobile parts are limited to those of one automobile manufacturer, a conventional automobile repair estimate issuing system (or device) requires a part data file having a considerably large memory capacity. As magnetic tape has usually been employed as the memory medium of the data file, it has heretofore been impossible to manufacture the estimate issuing system as a portable device. Accordingly, inconveniently it has been impossible to issue a repair estimate using a device of this type immediately at an automobile repairing station.

SUMMARY OF THE INVENTION

Accodingly, an object of the present invention is to provide a portable type automobile repair estimate issuing device in which a data file is stored in a memory medium with the memory capacity reduced, and the input and output devices, the central processing circuits, the memory and the printing device are reduced in size and weight, so that the device can be readily used in an automobile repairing station to issue repair estimates on the spot.

In accordance with this and other objects of the invention, there is provided a portable type automobile repair issuing device including memory means in which name coded data corresponding to automobile part names, name data corresponding to the automobile part names and part data correspondibng to automobile parts are stored. Input means is provided for inputting the name coded data corresponding to the automobile part names to a central processing unit which carries out predetermined data processing operations. Part data stored in the memory is extracted selectively according to name coded data applied to the central processing means to provide estimation data in response to which a printer issues a printed estimate. The memory means is provided with a first file for storing the part data other than the name data and a second file for storing the name data corresponding to the automobile part names. The central processing means, according to each name coded data segment applied thereto, combines the corresponding part data stored in the first file and corresponding name data stored in the second file to provide estimation data which is used to operate the printer.

The foregoing object and other objects as well as the specific features of the invention will become more apparent from the following detailed description and the appended claims when read in conjunction with the accompanying drawings.

DESCRIPTION OF THE PREFERRED EMBODIMENTS

A first embodiment of a portable type automobile repair estimate issuing device according to the invention will be described with reference to FIGS. 1 through 6.

Figure 1:
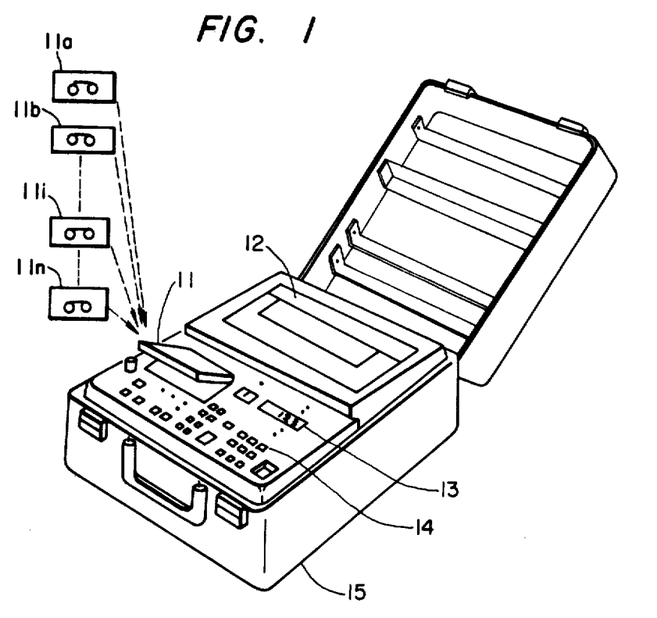
FIG. 1 is a perspective view showing the external appearance of a first embodiment of a portable type automobile repair estimate issuing device according to the invention.

In FIG. 1, reference character 11 designates a cassette type magnetic tape device for reading data from a cassette type magnetic tape on which reduced part data files have been stored, 11a through 11n cassette type magnetic types on which part data for various types of automobiles have been stored, 12 a printer which is selected to reduce the size and weight of the portable type automobile repair estimate issuing device with the printer being adapted to issue an estimate, 13 a digital display section for displaying input data, 14 a keyboard for inputting data, and 15 a small case with a handle in which the portable type automobile repair estimate issue device is mounted.

In the first embodiment, the system has a weight of about 10 kg and has external dimensions of 350 mm (width)×430 mm (length)×125 mm (height). Therefore, the portable type automobile repair estimate issuing device (hereinafter referred to merely as "an estimate issuing device" when applicable) of the invention can be readily carried to any desired location and a repair estimate issued immediately on the spot. In FIG. 1, a central processing unit and memory are not shown as they are enclosed in the case 15.

Figure 2:
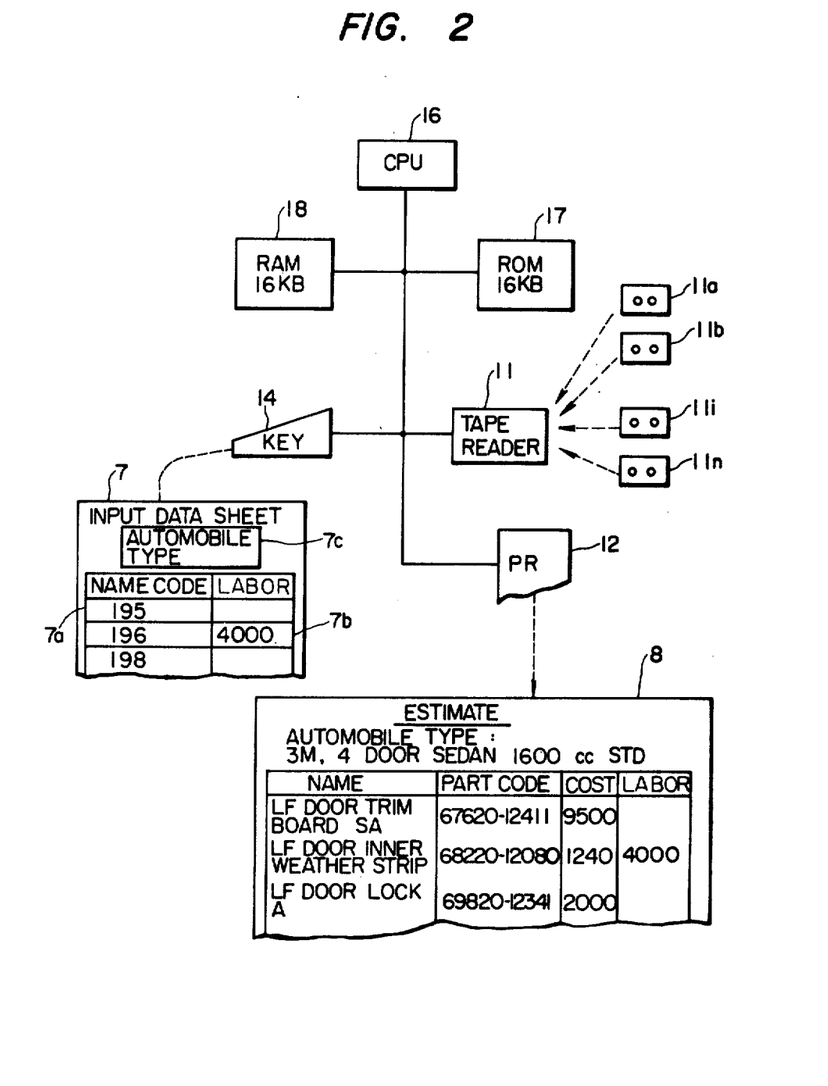
FIG. 2 is an explanatory diagram showing the internal arrangement of the device shown in FIG. 1.

FIG. 2 shows the systematic arrangement of the estimate issuing device described above. In FIG. 2, reference numeral 16 designates a central processing unit using a microprocessor and 17 a memory for storing a control program to control the system and a data processing program. The memory 17 may, for example, be a ROM (read-only memory) having a capacity of 16 KB. Reference numeral 18 designates a memory for storing processing data which may be a RAM (random access memory) having a capacity of 16 KB. Reference numeral 11 designates a cassette type magnetic tape reader, as above, and 11a through 11n cassette type magnetic tapes on which parts data for various types of automobiles has been stored.

Name coded data 7a, labor cost estimates 7b and other automobile data 7c are written on a data sheet 7 by an operator and are inputted through the keyboard 14 manually.

Further in FIG. 2, reference numeral 12 designates a printer for printing an estimate 8. Especially, a printer of small size and light weight should be selected.

Figure 3:
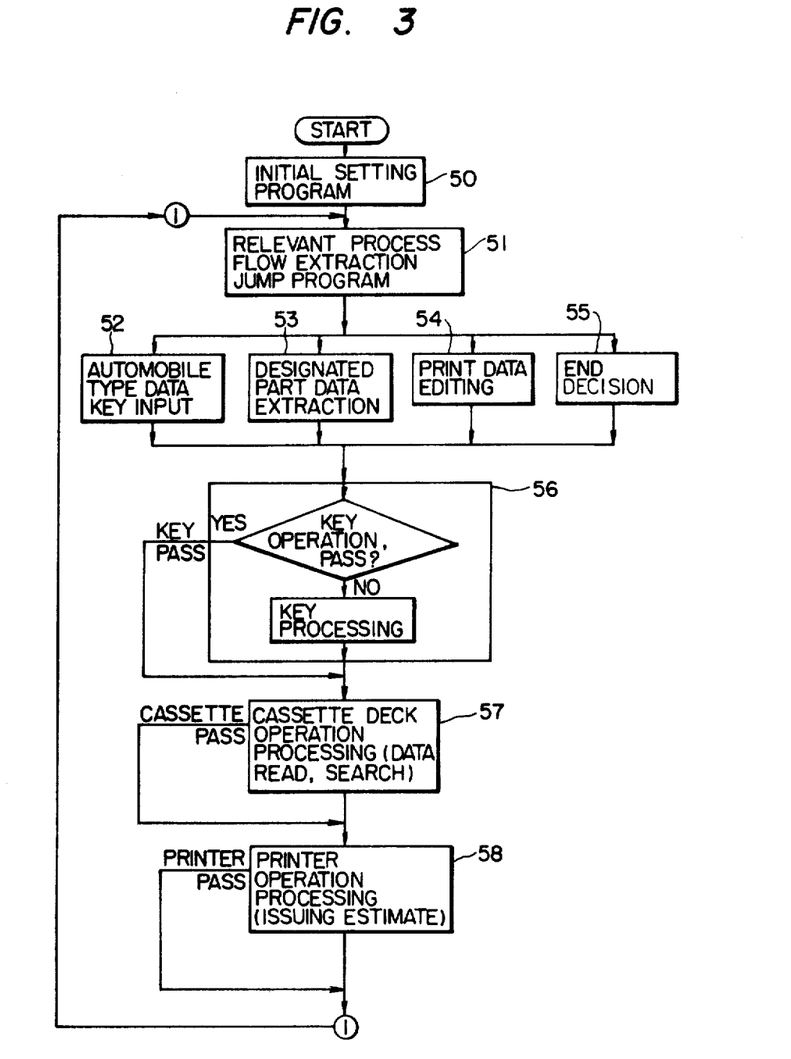
FIG. 3 is a flow chart for a description of the operation of the device shown in FIGS. 1 and 2.

Designated functions of an operation console for operating all the system are activated in association with the keyboard 14 and the program in the ROM 17 as shown in FIG. 3.

Referring to FIG. 3, Step 50 concerns an initial setting program with which all the system is initially reset and initial states are set and Step 51 relates to a relevant process flow extraction jump program for selecting one of the programs of the following Steps 52 through 55. Step 52 concerns an automobile type data key input process program for processing automobile type data inputted through the keyboard. Step 53 concerns designated part data extraction program for extracting particular part data from a part data file according to the name coded data inputted through the keyboard. Step 54 concerns a print data editing program for editing the data thus extracted to cause it to be printed or for storing the extracted data in the memory. In addition, Step 54 includes a program for issuing an estimate from the printer. Step 55 concerns a program for accomplishing a processing operation. In Step 55 a process of Step 51 concerning a process flow extraction jump program is carried out again so as to prepare for issuing the next repair estimate. Step 56 concerns a key process program for controlling key-inputted data and processing the data thus inputted. Step 57 concerns a cassette deck operation process program for controlling a cassette type magnetic tape for reading and processing the data stored on the tape. Step 58 concerns a printer operation process program for controlling a printer operation to print out the data.

Figure 4:
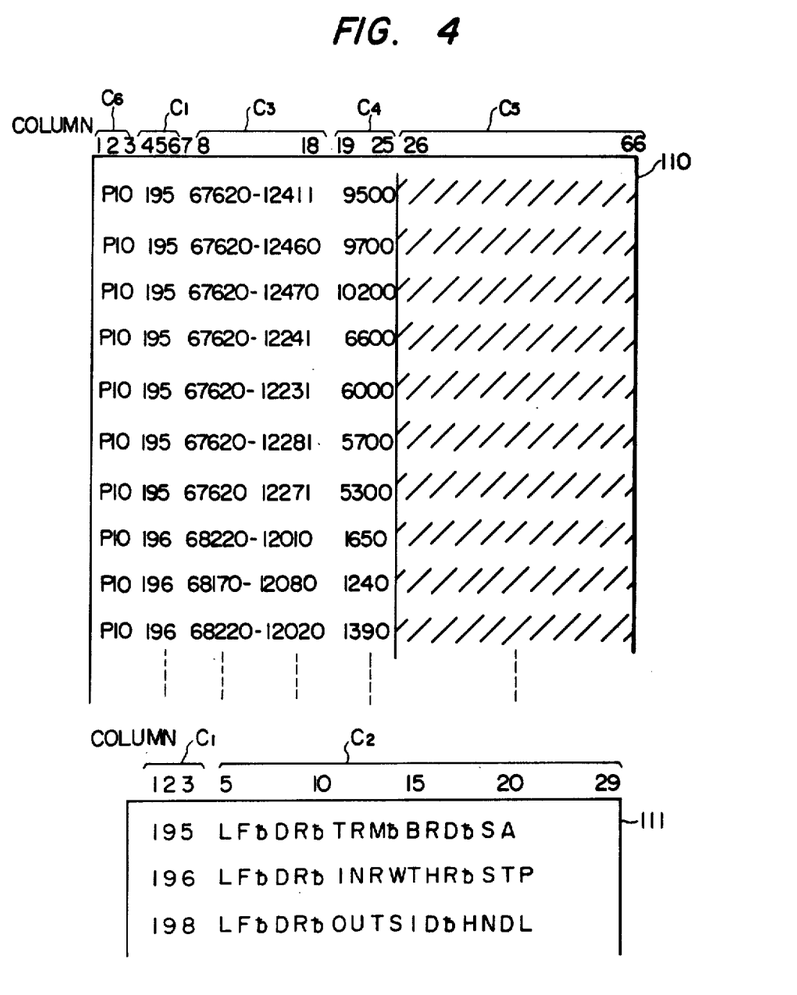
FIG. 4 is an explanatory diagram showing parts of reduced part data files.
Figure 5:
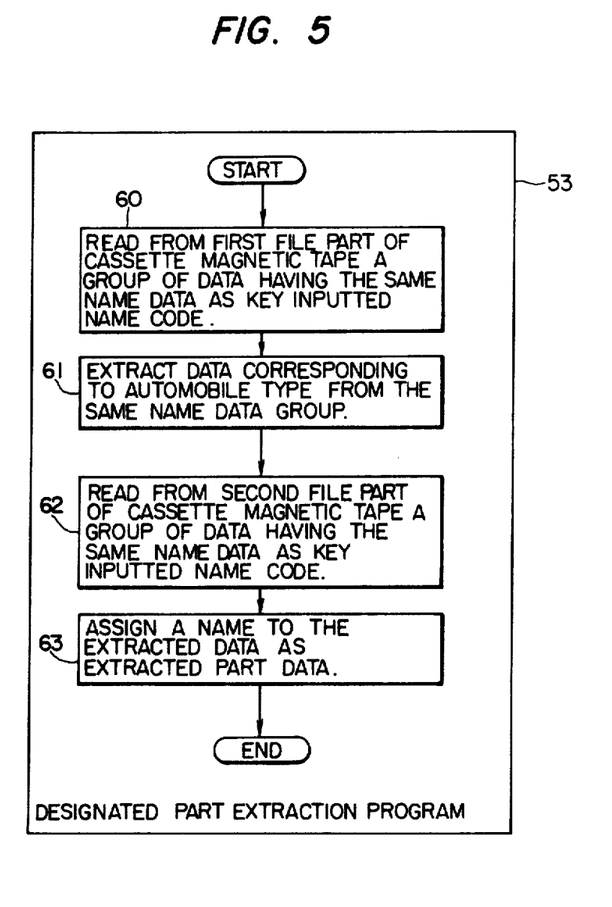
FIG. 5 is a flow chart of an designated part data extraction program employed in the first embodiment of the device according to the invention.

FIG. 4 shows a part of the part data file with the memory capacity reduced which is employed in the estimate issuing device of the invention. In FIG. 4, reference numeral 110 designates a first file, or part data file, in which name data corresponding to automobile part names is not provided. In the file, however, name-coded data is provided which is considerably effective in use as it functions both as name data and as indexing codes. Further in FIG. 4, reference character C1 designates a name-coded data memory region, C3 a part number code memory region, C4 a cost value memory region, C5 a part data indentification coded data memory region, and C6 an automobile type code data memory region.

Further in FIG. 4, reference numeral 111 designates a second file in which automobile part name data is provided. In the second file, reference numeral C1 designates a name coded data memory region, C2 a name data memory region. The total number of memory regions necessary for this data is twenty-nine columns.

The operation of the estimating issuing device shown in FIGS. 1 and 2 will be described with reference to FIGS. 3 through 6. In the portable type automobile repair estimating issuing device having the program arrangement illustrated in FIG. 3, the actual functioning of the device is concentrated only on the issuing of an automobile repair estimate. Therefore, the operations and functions of an operating console (including a cathode-ray tube display device and an operating keyboard) required for a general purpose computer can be effected by the keyboard 14 and the program stored in the ROM 17. Accordingly, it is unnecessary to provide such a large operating console, which contributes greatly to miniaturization of the entire system. At the same time, the estimate issuing device of the invention can be readily operated. Because of this feature, erroneous operations are prevented.

Figure 6:
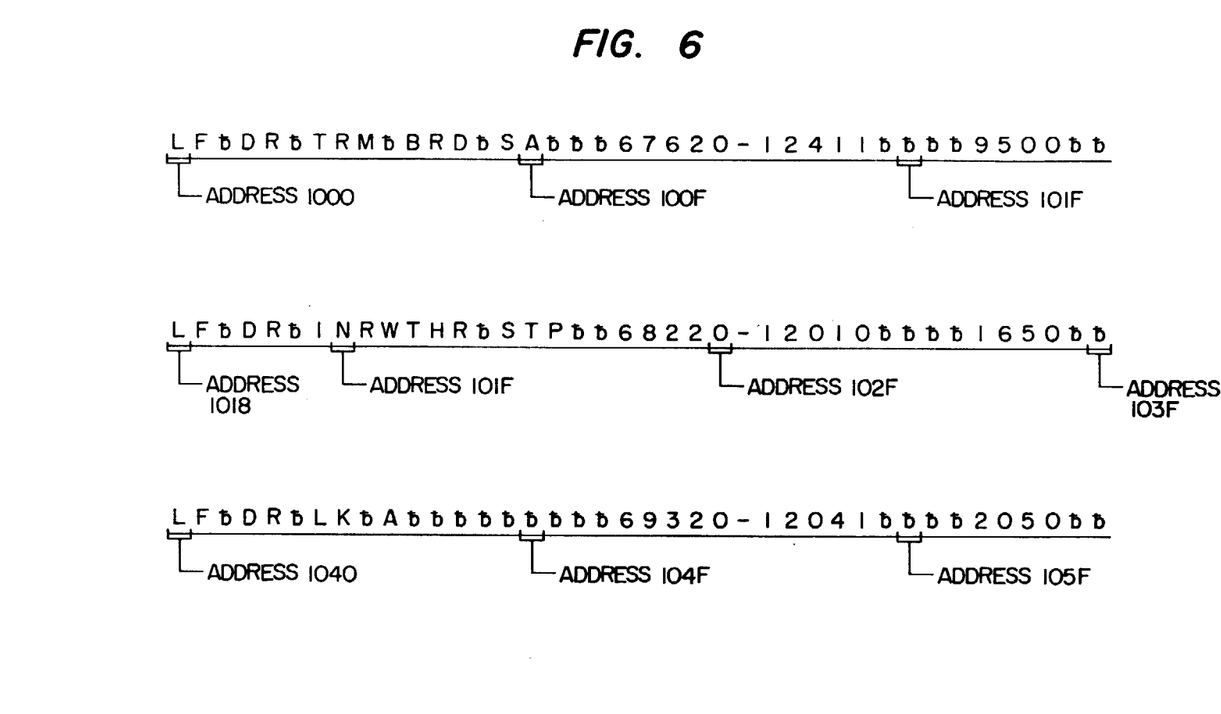
FIG. 6 is an explanatory diagram showing the state of extracted part data in the memory shown in FIG. 2.

In the initial setting program of Step 50 in FIG. 3, the start of the system which, heretofore, the operator had to carry out manually, and the initial setting of the input and output devices are automatically carried out. Following the initial setting operation, the automobile type data 7c written on the input data sheet 7 is processed by the automobile type data key input process program of Step 52 and the key process program of Step 56 with the resulting data stored in the memory, the RAM 18. Then, in order to extract designated part data from a cassette type magnetic type 11i according to the name coded data 7a from the input data sheet, the designated part extraction program of Step 53, the key process program of Step 56 and the cassette deck operation process program of Step 57 are used by the central processing unit 16. With these programs, whenever designated part data is extracted, it is stored in the RAM 18 by the print data edition program of Step 54. For instance in the case where name codes "1 9 5", "1 9 6" and "1 9 8" from the input data sheet 7 in FIG. 2 are processed, the extracted data is stored at addresses 1000# through 1067# in the memory 18 as shown in FIG. 6. (In this connection, the symbol # suffixed to an address is intended to mean that the numerical value is expressed in hexadecimal notation.) In the case of FIG. 6, the data stored in the RAM 18 is processed by the printer operation process program of Step 58 so as to be issued as an estimate 8.

Data read from the cassette type magnetic tape 11i for extracting designated part data is shown in FIG. 4. For instance, for the name code "1 9 5" on the input data sheet 7 in FIG. 2, seven different data segments are loaded from the first file, namely, the part file 110. That is, in Step 60 in FIG. 6, a group of data having the same name data as the key-inputted name code (hereinafter referred to as the same name data group when applicable) is read from a first file part of the magnetic tape 11i. Then, in Step 61, data corresponding to the automobile type is extracted from the same name data group. In this extraction operation, the automobile type data 7c inputted from the input data sheet 7 is utilized. In Step 62, a name with the same name code as the key-inputted name code "1 9 5" or a part name corresponding to the name code "1 9 5", for example, "LF door trim board SA" is read from the second file, the name data file 111, of the magnetic tape 11i. In Step 63, a name is assigned to the data corresponding to the automobile type. Thus, finally, extracted part data is obtained.

As is apparent from the above description, the estimate issuing device of the invention operates similarly to the conventional system, but can be operated readily free from erroneous operation. Furthermore, as the device of the invention is portable, a correct estimate can be issued immediately at an automobile repairing station where an estimate is required.

Even for automobiles of different models, many part names are common. In other words, even if automobiles are manufactured in different years, or they differ in model, many of the parts differ only little in configuration. Accordingly, the above-described filing system is considerably effective in reducing the memory capacity.

Let us consider, for instance the case where the filing system of the invention is applied to a part data file including 700 different part names and 3000 different parts. If it is necessary to use a memory capacity of one byte per character, then the memory capacity can be reduced by about 50,000 bytes. This means that the entire memory capacity of the part data file is reduced by about 20%.

However, a filing system having a first file storing part data other than the name data and a second file storing the name data cannot satisfy the requirement that only one kind of name code is assigned to a plurality of names.

A second embodiment of a portable type automobile repair estimate issuing device of the invention will be described with reference to FIGS. 7 through 11.

Figure 7:
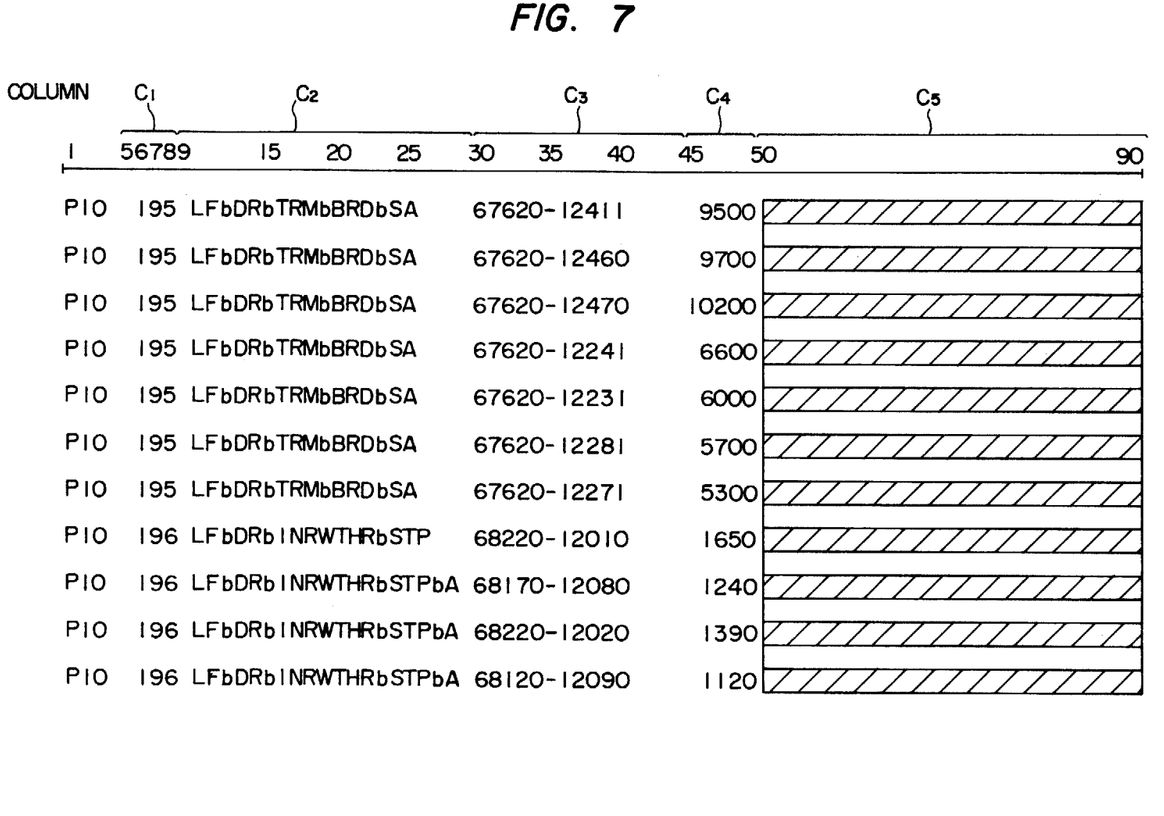
FIG. 7 is an explanatory diagram showing a portion of a part data file employed in a second embodiment of the device of the invention.

FIG. 7 shows a data file which is provided by a reel type magnetic type before the above-described automobile part data file provided by the cassette type magnetic tape is divided into the first and second files described above. For instance, for the name code "1 9 6", two different names "LF door inner weather strip" and "LF door inner weather strip A" are provided in FIG. 7, while in FIG. 4 only one name "LF door inner weather strip" is provided. This is acceptable since the rule that name codes be assigned in correspondence to names is employed. Therefore, "LF door inner weather strip A" is not stored in the name data file 111. As a result, even if the intended part has the name "LF door inner weather strip A", a different name "LF door inner weather strip" is printed on the estimate.

Figure 9:
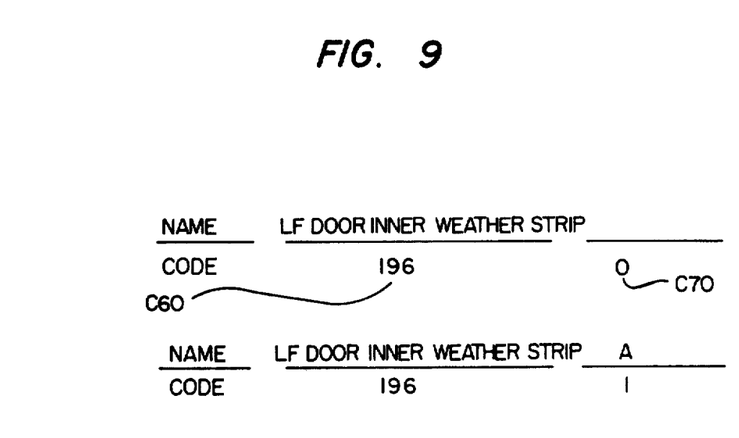
FIG. 9 is an explanatory diagram for a description of a method of assigning a name common portion code and a name auxiliary code.

In the second embodiment of an estimate issuing device of the invention, as shown in FIG. 9, a name common portion code C60, which can be completely the same as in the above-described name code, is assigned to a first name portion "LF inner weather strip" of a compound name having a name "LF inner weather strip" and a name "A", and a name auxiliary code C70 is assigned to the second name portion "A" of the compound name. Thus, in correspondence to codes obtained by combining the name common portion codes and the name auxiliary coees, part names are stored in a second file, or name data file, in order to improve the quality of name data printed on an estimate.

In this connection, the assignment, for instance, of a name code "1 9 6" and a name code "1 9 7" to "LF inner weather strip" and "LF inner weather strip A", respectively, assigning individual name codes to each part names, is not practical because it is then necessary that 65 part names, codes corresponding to the part names and automobile type codes for the part names be listed on the input data sheet in one-to-one correspondence.

Moreover, if an operator does not know the specific names to be extracted in advance, he cannot select, for instance, the above-described codes "1 9 6" and "1 9 7".

Figure 8:
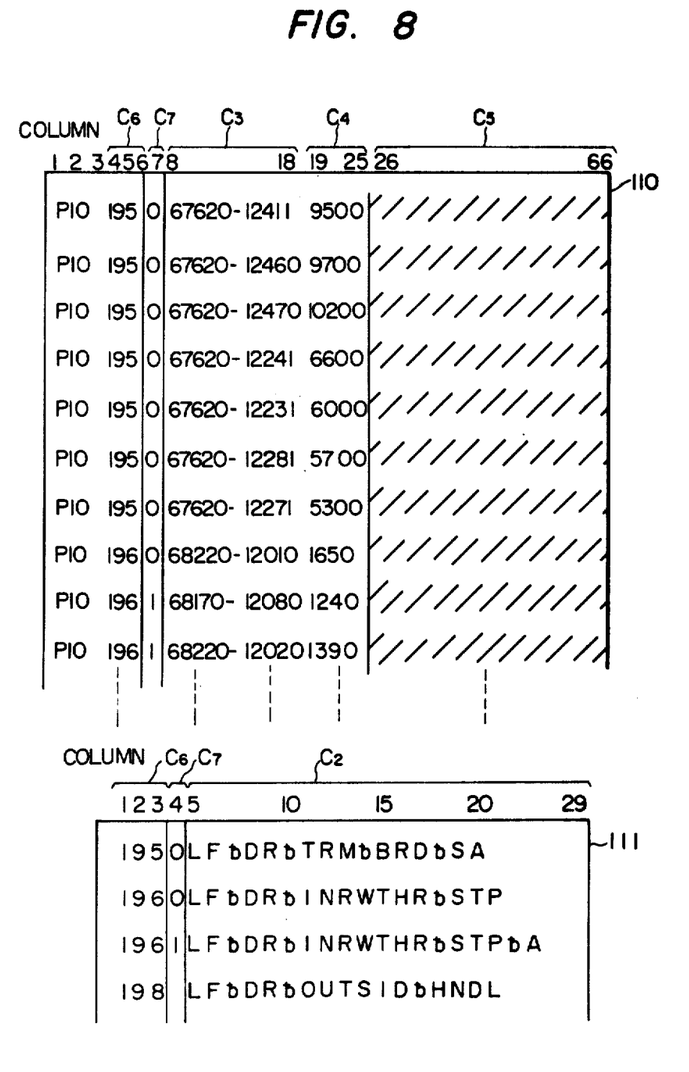
FIG. 8 is an explanatory diagram showing parts of reduced part data files employed in the second embodiment of a device of the invention.

The actions of the name common portion code C6 and the name auxiliary code C7 which are shown in FIG. 8 will be described with reference to FIG. 10.

For instance, when the name code "1 9 6" from the input data sheet 7 is inputted through the keyboard 14, a predetermined cassette type magnetic tape 11*i* is selected, and a data file as shown in FIG. 8 is read from the magnetic tape. Form the data file thus read, among the data of the name common portion code "1 9 6", a data segment or group corresponding to the automobile type is extracted in accordance with Steps 60 and 61 in FIG. 5. As the part name extraction operation carried out following this operation is different from those indicated in FIG. 5, it will be described with reference to FIG. 10.

Figure 10:
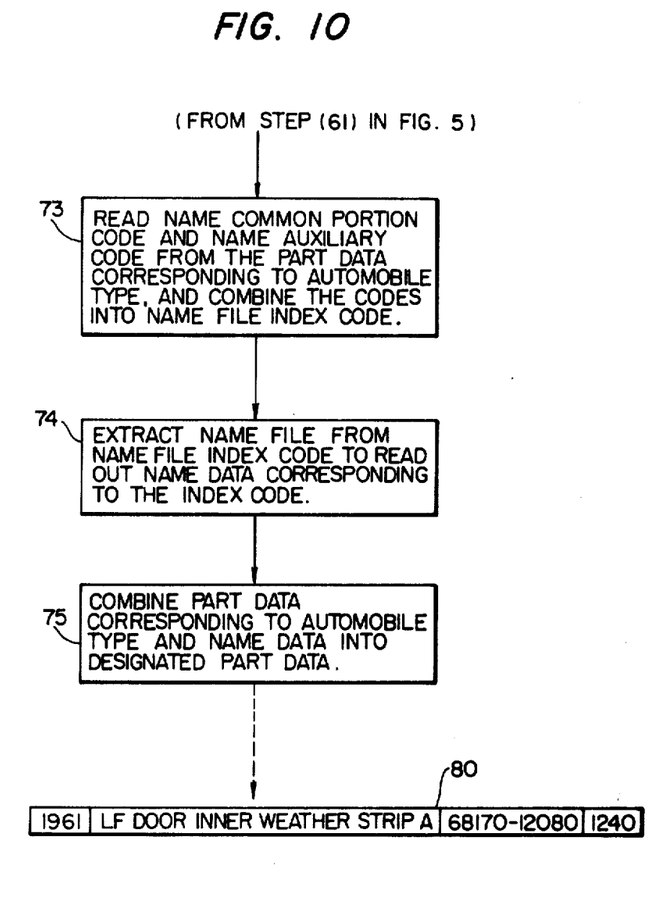
FIG. 10 is a flow chart of an extraction program employed in the second embodiment of the device according to the invention.

In Step 73 in FIG. 10, the name common portion code "1 9 6" and the name auxiliary code "1" are extracted from the part data corresponding to the automobile type and are then combined into an indexing code "1 9 6" which is used to index the name file 111 in FIG. 8. In Step 74, a part name corresponding to the indexing code "1 9 6" is extracted from the name file 111 in FIG. 8. This is, the part name corresponding to the indexing code "1 9 6 1" is "LF door inner weather strip A". Finally, in Step 75, the part data extracted in Step 61 and the name extracted in Step 74 are combined into the desired part data 80 corresponding to the specific designated part.

Figure 11:
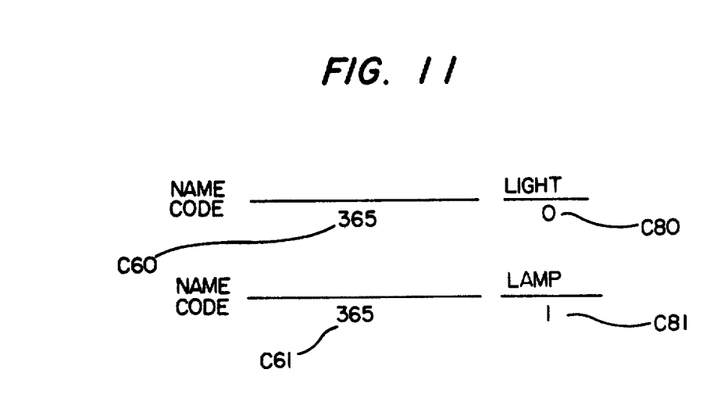
FIG. 11 is an explanatory diagram for a description of another embodiment of the method illustrated in FIG. 9.

FIG. 11 shows the case where the technical concept of the invention is applied to a plurality of part names which are completely different. In this case, nothing is provided for the name common portion codes and, for instance, "lamp" and "light" are provided for the name auxiliary codes C70.

As is apparent from the above description, in the second embodiment of an estimate issuing device of the invention, the contents of data written on the input data sheet 7 and the contents of data inputted by the keyboard 14 are not changed at all. In other words, estimate data can be obtained by inputting this data directly and without modification. Even if part names have the same code, they will be printed differently on the estimate sheets if they correspond to different types of automobiles.

A third embodiment of an estimate issuing device of the invention, in which an estimate which has been issued previously can be reissued after the contents thereof have been partially changed will be described with reference to FIGS. 12 through 15.

Figure 12:
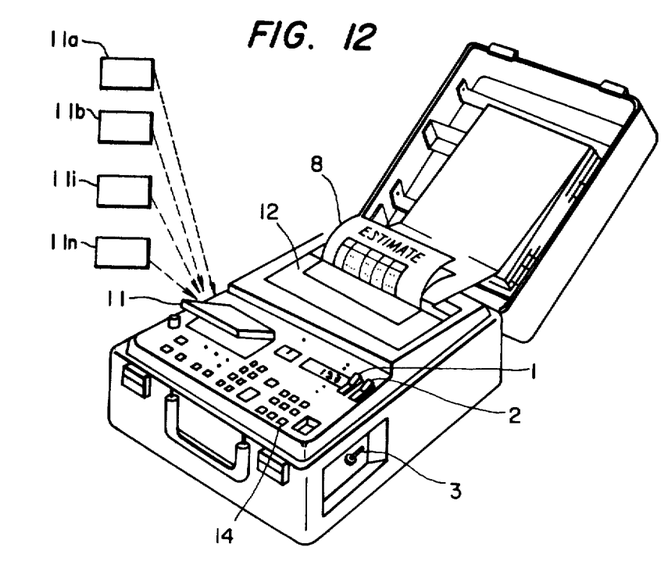
FIG. 12 is a perspective view showing an external view of a third embodiment of a device according to the invention.

FIG. 12 shows the external appearance of a portable type automobile repair estimate issuing device of the third embodiment, which includes a repeat print switch for starting the repeat print function, a manual print switch for starting the manual print function, and a test print switch for starting the test print function.

In FIG. 12, reference numerals 1, 2 and 3 designate the repeat print switch, the manual print switch and the test print switch, respectively. The test print switch 3 is provided in a recess formed in the case so that it cannot be activated accidentally.

Figure 13:
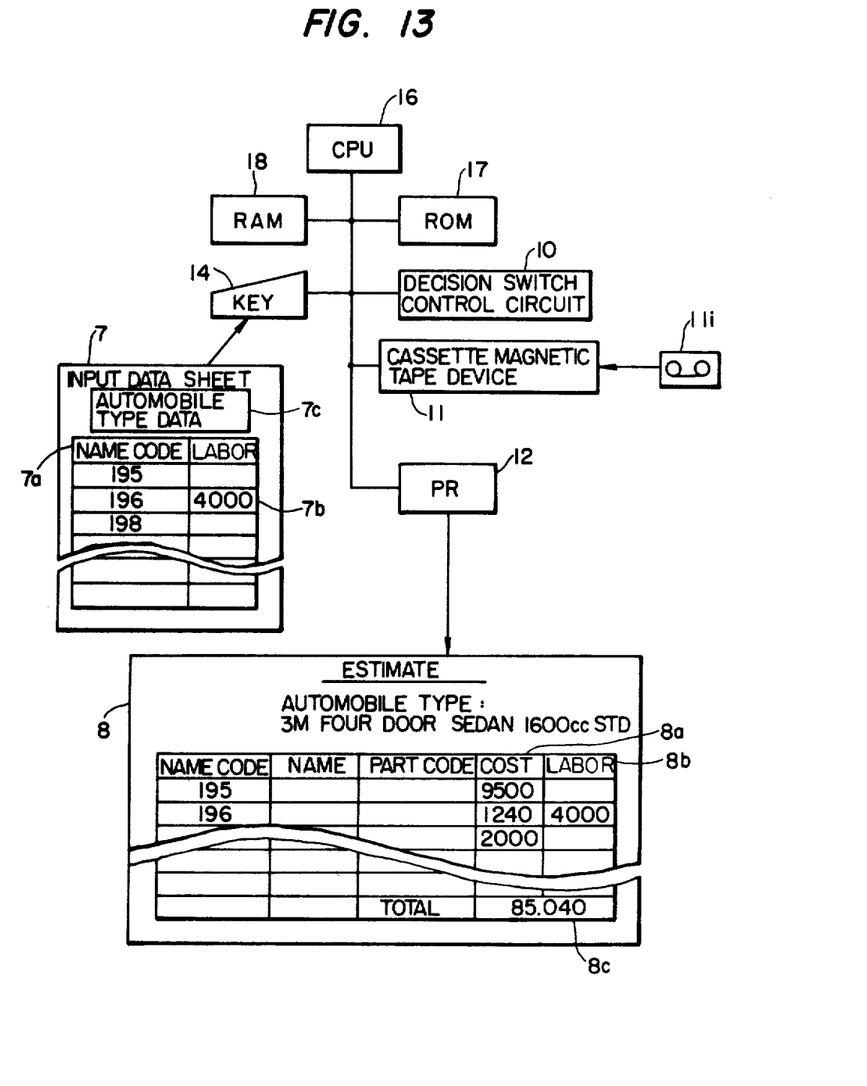
FIG. 13 is an explanatory diagram showing the internal arrangement of the device shown in FIG. 12.

FIG. 13 shows the systems arrangement of the device shown in FIG. 21. In FIG. 13, reference numeral 10 designates a decision switch control circuit provided with the above-described switches 1, 2 and 3 and which communicates the states of these switches to the central processing unit 16. Similarly as for the input and output devices, the control circuit 10 is connected to a central processing unit 16.

Figure 14:
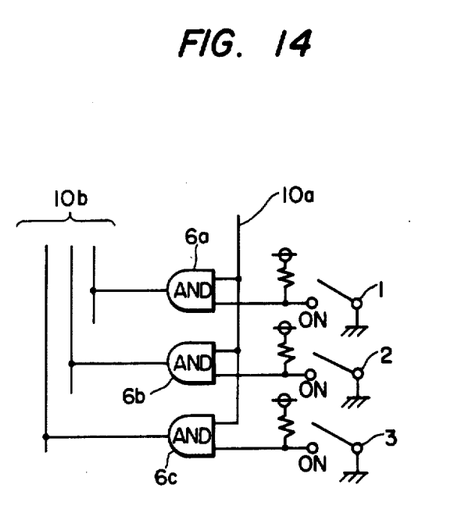
FIG. 14 is a circuit diagram showing a circuit which is particularly employed in the third embodiment of the invention.

The decision switch control circuit 10 is shown in greater detail in FIG. 14. The repeat print switch 1, the manual print switch 2 and the test print switch 3 are connected respectively to identical circuits. More specifically, the switches 1, 2 and 3 are connected to first input terminals of two-input AND circuits 6a, 6b and 6c, respectively, to the other input terminals of which a decision switch read instruction signal line 10a is connected. A input signal applied to the signal line 10a is raised to a high logical level in response to a decision switch status read instruction used by a program which is additionally provided in the third embodiment.

The outputs of the three AND circuits coupled to the three switches are connected to data signal lines 10b through which the states of the switches are transmitted to the central processing unit.

Figure 15:
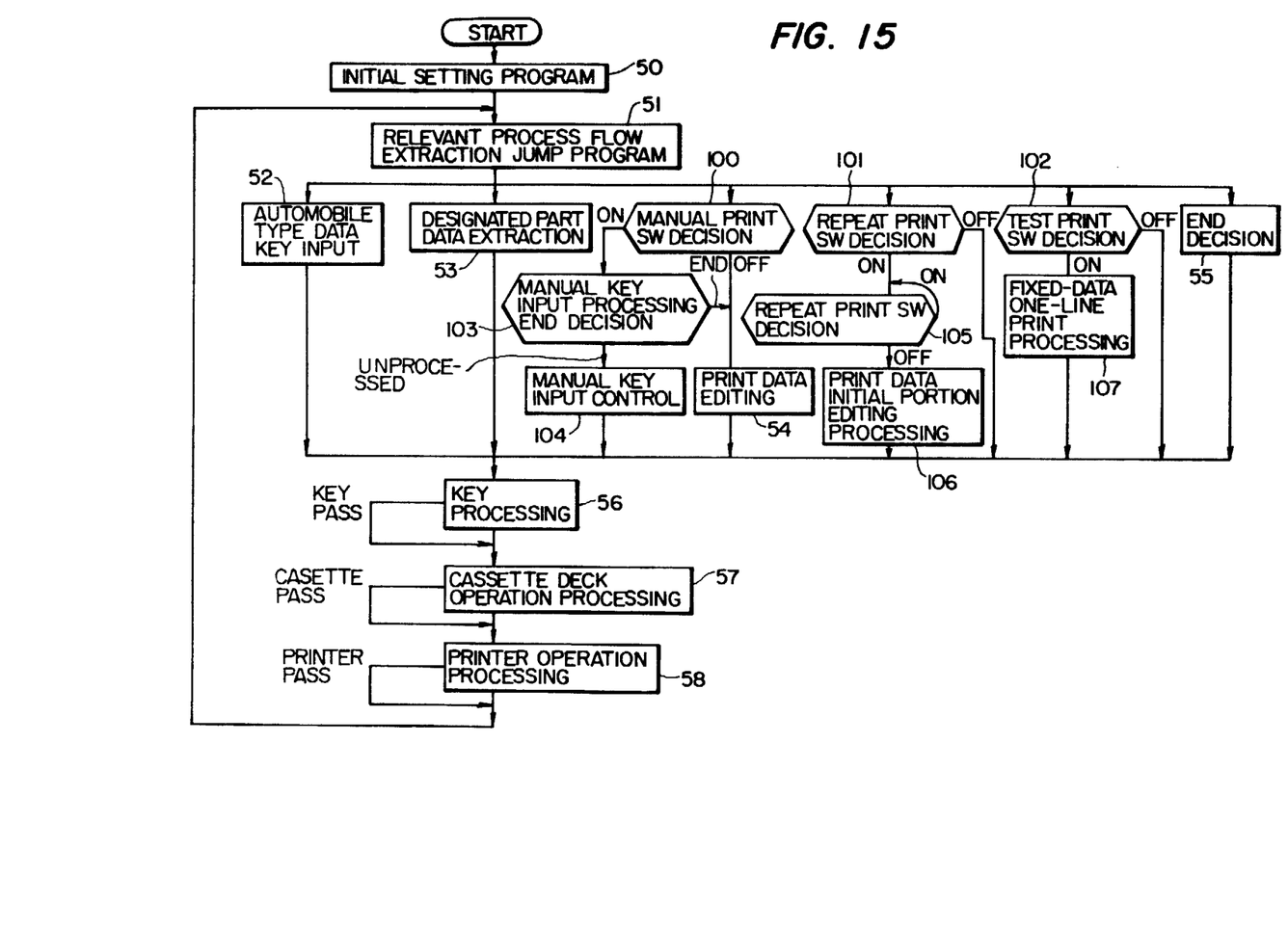
FIG. 15 is a flow chart for a description of the operation of the third embodiment of a device according to the invention.

FIG. 15 shows the program arrangement which is obtained by adding the above-described repeat print function, manual print function and test print function to the control program and data process program which are stored in the ROM 17. Step 101 in FIG. 15 is a repeat print switch state decision program for determining a state of the repeat print switch. The content of Step 101 is the same as Step 105. Step 106 is a print data heading editing process program for carrying out a process necessary before the editing of the first line print data in order to issue an estimate.

Step 100 concerns a manual print switch state decision program for determining the state of the manual print switch, Step 103 is a manual key-input process completion decision program which is especially added in order to key-input manual print data, and Step 104 is a manual key-input process program which is also especially added in order to key-input manual print data.

Step 102 concerns a test print switch state decision program for determining the state of the test print switch and Step 107 is a fixed-data one-line print process program which is especially added in order to print test print data. The term "fixed-data" is intended to mean a test pattern which is printed for a test print operation.

The repeat print function, the manual print function and the test print function of the estimate issuing device of the invention will be described with reference to FIG. 15.

When the repeat print switch 1 is turned ON in the printing operation, the repeat print switch decision step, Step 101, is shifted to the next repeat print switch decision step, Step 105, in which the same operation is maintained until the repeat print switch 1 is turned OFF. When the repeat print switch 1 is turned off, Step 105 is shifted to Step 106 for a print data editing process program. In Step 106 a print data process required before the first line of the estimate is printed is carried out. In Step 58, a print operation process is carried out in order to print out the data for the estimate.

The repeat print switch 1 is effective only when it is turned OFF after first being turned ON.

When the manual print switch 2 is turned ON in the printing operation, in Step 100 the state of the manual print switch 2 is detected. In Step 104 for the manual key-input process completion decision, it is determined whether or not the manual print data has been inputted through the keyboard. If not, in Step 104 the manual key-input control operation is carried out. In a key process step in Step 56, processing is carried out so that the key-inputted data is replaced by data which is automatically stored as print data. Then, Step 56 is shifted through a relevant process flow extraction jump step, Step 51, to Step 100. If, in this operation, the manual print switch is maintained turned ON, the manual key-input process completion decision is carried out in Step 103 again. In this way, the manual key-input process is accomplished. Thereafter, Step 103 is shifted to Step 54, in which what is stored as print data are edited as print data. Then, in Step 58, one line of data of the estimate is printed.

Whenever one line is printed, data inputted through the keyboard is printed until the manual print switch 2 is turned OFF. After the manual print switch 2 is turned OFF, the data is automatically printed to the last line, i.e., an ordinary estimate-issuing operation is carried out.

In Step 102, the sensing of the state of the test print switch 3 is carried out by selection by the relevant process flow extraction jump step, i.e., Step 51, a number of times before the estimate is issued. When the test print switch 3 is in the ON state, the test pattern, stored as fixed data in the ROM 17, is processed by a fixed-data one-line print process program of Step 107, with the relevant data being printed by the printer operation process program of Step 58.

The test print data is printed continuously line by line until the test print switch 3 is turned off.

The operation of the estimate issuing device when the repeat print switch 1, the manual print switch 2 and the test print switch 3 are all OFF is the same as that of the device which is carried out without the use of the switches 1, 2 and 3.

The invention has been described with reference to an example where cassette type magnetic tapes are employed as the data file storing medium. However, the same effect can be obtained by using a flexible disc sheet, a semi-conductor non-volatile memory, a magnetic wire memory, a magnetic core memory, or the like.

Furthermore, in the above-described embodiments of an estimate issuing device, a keyboard is employed to input data. However, the objects of the invention can be achieved using other devices such as a bar code reader or an X-axis and Y-axis position detector, or by combining such devices with a keyboard or the like.

The invention has been described with respect to specific automobile type "3M". However, if one type of name coded data and one type of name data are employed so that unified automobile data can be used for different automobile types, then the memory capacity can be further reduced.

In the second embodiment of the estimate issuing device of the invention, the name common portion code is in three digit form and the name auxiliary code is of single digit form. However, the objects of the invention can be achieved, for instance, by changing the number of digits of the name common portion code to five or six and the number of digits of the name auxiliary portion code to two or three. Importantly, the name auxiliary portion code is provided in the file only and is not used externally. Therefore, the objects of the invention can be achieved even by employing codes such as hexadecimal numbers, base-32 numbers or base-64 numbers which are rather difficult to understand by a human operator.

In the third embodiment of the estimate issuing device of the invention, the manual print function, the repeat print function and the test print function have been described separately and independently. However, these functions may be combined into a compound function to achieve the objects of the invention. In this case, it is preferable to give precedence to the repeat print function over the manual print function so that, even during a manual printing operation, the estimate can be printed from the first line by operating the repeat print switch ON and OFF. In addition, a method may be employed in which the test print function is made inactive during the printing operations and made active by switchiing ON and OFF the repeat print switch.

Furthermore, if a function off passing key-inputs is added with respect to the manual print function, the manual print function can be used to temporarily stop the printer.

What is claimed is:

1. A portable type automobile repair issuing device comprising: memory means in which at least name coded data corresponding to automobile part names, name data corresponding to said automobile part names, data representing automobile types, and part data corresponding to automobile parts are stored; input means for inputting selected name coded data entries corresponding to said automobile part names and data representing an automobile type; central processing means; printing means for printing an automobile repair estimate in which the part data stored in said memory means is extracted selectively according to name coded data entries and said data representing said automobile type applied to said central processing means to provide estimation data, said printing means printing an estimate according to said estimation data; said memory means being provided with a first file for storing said part data other than said name data and a second file for storing said name data corresponding to said automobile part names;

said central processing means, according to each name coded data entry applied to said central processing means and said data representing said automobile type, combining corresponding part data stored in said first file and corresponding name data stored in said second file to provide estimation data, said printing means printing an estimate according to said estimation data.

2. The device as claimed in claim 1 wherein said memory means comprises a random access memory and said output means comprises a keyboard.

3. A portable type automobile repair estimate issuing device comprising memory means in which at least name coded data corresponding to automobile part names, name data corresponding to said automobile part names, data representing automobile types, and part data corresponding to automobile parts are stored, said memory means being provided with a first file for storing said part data other than name data and a second file for storing said name data corresponding to said automobile part names; central processing means for performing predetermined data processing operations according to each name coded data entry applied to said central processing means and data representing an automobile type, wherein said central processing means combines for each name coded data entry and data representing an automobile type corresponding part data stored in said first file and corresponding name data stored in said second file to provide estimation data including compound name data; printing means for providing a printed output according to said estimation data; each segment of said compound name being data obtained by combining a plurality of names comprising first and second name portions, and a name common portion code being assigned to said first name portions, and a name auxiliary code being assigned to said second name portion.

4. A portable type automobile repair estimate issuing device comprising: memory means in which at least name coded data corresponding to automobile part names assigned according to automobile types, name data corresponding to said automobile part names and part data corresponding to said automobile part names are stored; input means for inputting said name coded data and data corresponding to an automobile type; central processing means; printing means for printing automobile repair estimates wherein said central processing means, according to each segment of name coded data applied to said central processing means, extracts part data stored in said memory means separately according to automobile types selectively to provide estimation data, and said printing means prints an estimate according to said estimation data; said name coded data corresponding to said automobile types and said name data corresponding to said automobile types being unified by said central processing means for all said automobile types into one type of name coded data and name data; said memory means being provided with a first file for storing said part data other than said name data and a second file for storing said name data corresponding to said automobile part names; said central processing means operating to combine according to each name coded data entry applied to said central processing means corresponding part data stored in said first file and corresponding name data stored in said second file to provide estimation data; and said printing means printing an estimate according to said estimation data.

5. A portable type automobile repair estimate issuing device comprising: memory means in which data concerning automobile parts is stored; input means for inputting part name coded data entries corresponding to an automobile part names and identification coded data for identifying automobile types; central processing means; and printing means for printing an automobile repair estimate; said central processing means operating to extract according to data applied to said central processing means corresponding part data stored in said memory means to provide estimation data; said printing means printing an automobile repair estimate according to said estimation data; a repeat print switch for effecting a repeat printing function for repeatedly printing said estimate; a manual print switch for effecting a manual print function in which a part of said estimation data is replaced by data which is newly inputted by said input means; and a test print switch for effecting a test printing function for causing said printing means to print predetermined data.

6. The device as claimed in claim 5 which further comprises a decision switch control circuit for reading states of said repeat print switch, said manual print switch and said test print switch, said decision switch control circuit being coupled to said central processing means.

7. A method for preparing an automobile repair estimate, comprising the steps of: inputting to a first memory name coded data corresponding to automobile part names and data representing an automobile type in which the automobile parts are to be used; extracting from a first file of a second memory groups of data having the same name coded data as inputted in said step of inputting; extracting from said groups of data entries containing the same automobile type as inputted in said step of inputting; unifying with the extracted data entries a part time by retrieving said part name from a second file of said second memory to thus assemble completed repair estimation data; and printing an estimate in accordance with the assembled repair estimation data.

8. The method of claim 7, wherein said name data comprises compound name data comprising a name common portion code and a name auxiliary code, and wherein said step of unifying comprises extracting said compound name data in segments from said second file.

9. The method of claim 7, further comprising the step of effecting a manual print function in which a part of said estimation data is replaced by newly inputted data.

* * * * *